United States Patent Office 2,761,874
Patented Sept. 4, 1956

2,761,874

AMINO DERIVATIVES OF N-ALKYL SUBSTITUTED ASPARTIC ACIDS AND THEIR FUNCTIONAL DERIVATIVES

Frederick C. Bersworth, Framingham Center, and Albert E. Frost, Millis, Mass., assignors, by direct and mesne assignments, to The Dow Chemical Company, Midland, Mich., a corporation of Delaware No Drawing. Application September 30, 1954, Serial No. 459,546

5 Claims. (Cl. 260—534)

This invention relates to amino derivatives of N-alkyl substituted aspartic acids and to their functional derivatives. The invention includes the new compounds themselves and a method of producing them.

The amino derivatives of N-alkyl substituted aspartic acids and their functional derivatives possess interesting and useful properties as sequestering agents for heavy metal ions and as intermediates for the synthesis of more highly substituted and complex derivatives of N-alkyl substituted aspartic acids and their functional derivatives which have utility for diverse purposes.

We have found that alkylene diamines and dialkylene triamines react readily and under mild conditions with maleic acid esters to yield amino derivatives of N-alkyl substituted aspartic acid esters having the general formula:

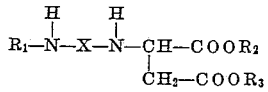

in which $R_1$ is a member of the group consisting of hydrogen, β-hydroxy alkyl and primary amino alkyl and β-hydroxy alkyl and primary amino C-alkyl substituted alkyl radicals containing not less than 2 and not more than 3 carbon atoms spaced between the primary amino nitrogen and secondary amino nitrogen atoms; X is a bivalent alkylene radical which places 2 or 3 carbon atoms between the amino nitrogens, such as ethylene, methylethylene and 1,2-cyclohexylene; $R_2$ and $R_3$ may be alike and are selected from the group consisting of hydrogen and alkyl radicals, preferably those of low molecular weight, but the said alkyl radicals may be derived from any alcohol which would form the ester indicated, and $R_2$ and $R_3$ may also be hydrogen, alkali metal, ammonium and substituted ammonium.

In the present invention the preferred form is that in which the alkyl groups of the $R_1$ substituent and the alkyl radicals identified as X have the same configuration and number of carbon atoms so that when $R_1$ is other than hydrogen the compounds of this invention will be represented by the following general formula:

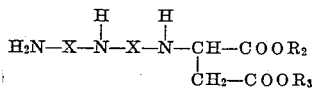

In the specific case in which $R_1$ is hydrogen and X represents the ethylene radical the compounds become monosubstituted derivatives of ethylenediamine. Such compounds are more conveniently described as N-2-aminoethyl aspartic acids and esters.

In those compounds of the present invention wherein X represents the isopropylene or n-propylene radicals, the compounds are monosubstituted derivatives of isopropylene diamine and of trimethylene diamine respectively or may be more conveniently described as dialkyl esters of N-(2-(2-amino isopropyl)-aminoisopropyl)- and N-(3-(3-aminopropyl)-aminopropyl)-aspartic acids.

When $R_1$ is a member of the group consisting of primary aminoalkyl and primary amino C-alkyl substituted alkyl radicals and since the number and arrangement of carbon atoms in the alkyl portion of $R_1$ is the same as that of the number and arrangement of the carbon atoms in the X radical, the compounds of the present invention are monosubstituted derivatives of dialkylene triamines.

To illustrate, when X represents the ethylene radical, $R_1$ represents the 2-aminoethyl radical and the compound is then a monosubstituted derivative of diethylene triamine or, more specifically, an N-(2-(2-aminoethyl)-aminoethyl)-aspartic acid derivative. When X represents the isopropylene radical, $R_1$ stands for the 2-aminoisopropyl radical and the compound is then a derivative of di-isopropylene triamine and may be described as a derivative of N-(2-(2-aminoisopropyl)-aminoisopropyl)-aspartic acid.

The reactions of the alkene diamines or dialkylene triamines with maleic acid esters are exothermic and are preferably carried out by the slow addition of the maleic acid ester to the alkylene diamine or dialkylene triamines in a molar ratio of 1 to 1 in a suitable solvent such as tertiary butanol, benzene, toluene or dioxane. The addition of the maleic acid esters is so regulated that the temperature does not rise above 50° C. The reaction mixture may be heated to about 100° C. to accelerate the reaction but the use of high temperatures is to be avoided in order to prevent as much as possible side reactions which decrease the yield of the desired products.

For the preparation of the sodium salts of free acids of the amino derivatives of the N-alkyl substituted aspartic acids, it is not necessary to isolate the intermediate formed ester in pure form. Rather, the solid or syrupy residues remaining after removal of the solvent under reduced pressure, are saponified in the same apparatus.

The esters of the compounds of this invention are generally pale yellow, viscid syrups but vary from white crystalline solids to pale yellow syrups having a sweet pleasant odor. The free acids and their corresponding sodium salts vary from white crystalline products to extremely hygroscopic solids that rapidly become syrups on exposure to air. The esters are insoluble in water but soluble in the common organic solvents. The free acids and their sodium salts are extremely soluble in water and in aqueous solutions of acids and bases; a property which presents considerable difficulty in the isolation of these products.

The products of this invention can be separated in relatively pure form from the saponification mixtures by the use of a cationic exchange resin of the sulfonic acid type. This procedure is especially suited for those amino substituted N-alkyl aspartic acids in which the number of amino groups and carboxylic groups are equal such as in N-(2-aminoethyl)-aspartic acid and N-(2-aminoisopropyl)-aspartic acid.

Those products containing a plurality of amino groups in the molecule are very hygroscopic both as the free acids and as the sodium salts. These are best separated from their saponification mixtures by the use of a strong anion exchange resin.

As alkylene diamines suitable for this invention, there may be mentioned ethylene diamine, isopropylenediamine, trimethylene diamine, 1,3-diaminobutylene, 1,2-diaminobutylene and other alkyl derivatives of ethylene diamine and n-propylene diamine substituted on the carbon atoms.

The alkali metal, ammonium and ammonium base salts of the compounds generally may be formed by direct neutralization of the free acid with the corresponding base. Since the compounds are polycarboxylic acids the number of moles of base necessary to form a fully neutralized salt may be determined by inspection of the formula of the acid. Partially neutralized salts are formed by neutralization of the desired number of acid groups. The titration of the acids in the formation of partially neutralized salts may be followed by determining the point of inflection of the pH curve as the titration proceeds. In this fashion salts of sodium, potassium, lithium, cesium, rubidium, ammonium and substituted ammonium may be formed by direct neutralization to the appropriate degree and subsequent evaporation of solvent and isolation of the corresponding salt.

Dialkylene triamines which are suitable for this reaction are diethylene triamine, di-isopropylene triamine, di-(n-propylene) triamine and their derivatives which contain C-alkyl substituents.

The following examples are given to illustrate further the method which has been found suitable for preparing the compounds of this invention but the invention is not restricted to these examples.

Example 1

172.2 g. (1 mol.) diethyl maleate was added dropwise with rapid stirring to a solution of 60.1 g. (1 mol.) of anhydrous ethylene diamine in 500 ml. of tertiary butanol at 30° C. A fine white solid began to separate after approximately 65 percent of the diethyl maleate had been added. The mixture was allowed to stand at room temperature for 112 hours. The precipitate was then filtered off and the tertiary butanol removed from the filtrate under reduced pressure. The partly crystalline residue which remained was filtered and the solid combined with the first batch. The combined solids were washed with cold tertiary butanol, benzene and ether. It may be recrystallized from benzene as small glistening plates. This is the diethyl ester of N-(2-aminoethyl)-aspartic acid. 127 g. of the diethyl ester were saponified by heating with 240 g. of 20 percent caustic soda solution for about 20 hours. The liberated alcohol was removed by distillation at atmospheric pressure and N-(2-aminoethyl)-aspartic acid separated by passing the saponification mixture through a column of the acid form of an ion exchange resin washed to pH 4.5 and eluting with a 1:1 ammonia solution. Evaporation of the eluate gave a 68.5% yield of the acid as a light tan solid. Further purification was accomplished by repeated extraction with hot methanol. A white crystalline product is obtained which is very soluble in water and insoluble in organic solvents and which decomposes without melting at about 235° C. Aqueous solutions of N-(2-aminoethyl)-aspartic acid chelate heavy metal ions but do not chelate calcium.

The compound is generally used as the alkali metal salt, particularly the sodium salt. The industrial grade of material is recovered from the saponification mixture and may be used directly after removal of the alcohol. Where other alkali metal salts are desired a very useful technique is to accomplish the saponification with the corresponding alkali metal hydroxide, but frequently it is equally convenient to form the free acid and neutralize with the appropriate base.

Example 2

172.2 g. (1 mol.) of diethyl maleate was slowly added to a solution of 74.1 g. (1 mol.) of isopropylene diamine in 500 ml. of tertiary butanol at 35° C. The clear mixture was allowed to stand at room temperature for 137 hours after which time the tertiary butanol was removed under reduced pressure leaving a pale yellow syrup. On standing, the pale yellow residue crystallized to an almost white solid which could be purified by dissolving in benzene and reprecipitating by the addition of petroleum ether.

157.7 g. (0.6 mol.) of the diethyl ester were saponified by refluxing for 20 hours with 272 g. of 20% caustic soda. The alcohol formed on saponification was removed by distillation and the clear yellow hydrolyzate passed through a column of ion exchange resin washed to pH 4.5, eluted with a 1:1 ammonia solution and the eluate evaporated to dryness under reduced pressure.

The compound is generally used as the alkali metal salt, particularly the sodium salt. The industrial grade of material is recovered from the saponification mixture and may be used directly after removal of the alcohol. Where other alkali metal salts are desired a very useful technique is to accomplish the saponification with the corresponding alkali metal hydroxide, but frequently it is equally convenient to form the free acid and neutralize with the appropriate base.

There was obtained 104.0 g., a 91% yield of the acid as a light tan waxy product. This was further purified by dissolving in as small a volume of water as possible and precipitating the product out as a white crystalline material by the addition of ethanol. Aqueous solutions of the N-(2-amino-isopropyl) aspartic acid chelate heavy metal ions but do not chelate calcium.

Example 3

172.2 g. (1 mol.) of diethyl maleate was slowly added to 103.17 g. (1 mol.) of diethylene triamine in 500 ml. of tertiary butanol at 35° C. The clear solution was allowed to stand at room temperature for 120 hours at the end of which time the tertiary butanol was removed under reduced pressure until the temperature of the residue rose to 95° C. There was obtained 235 g. of a pale yellow syrup which is probably diethyl N-(2-(2-aminoethyl)-aminoethyl) aspartate. This is an 85.5% yield.

206 g. (0.75 mol.) of the diethyl ester were saponified by refluxing with 340 g. of 20% caustic soda for 20 hours. The alcohol formed by saponification was removed by distillation at atmospheric pressure. The residue, a pale yellow solution, forms soluble chelates with copper, nickel, iron and cobalt.

The compound is generally used as the alkali metal salt, particularly the sodium salt. The industrial grade of material is recovered from the saponification mixture and may be used directly after removal of the alcohol. Where other alkali metal salts are desired a very useful technique is to accomplish the saponification with the corresponding alkali metal hydroxide, but frequently it is equally convenient to form the free acid and neutralize with the appropriate base.

The crude disodium salt may be obtained by adding ethanol to the saponified ester, dissolving the oil which separates in methanol and precipitating the crude disodium salt by the addition of acetone. Repeated dissolution and reprecipitation gave a hygroscopic white solid. Passage of a portion of the hydrolyzate through a column of the alkaline form of an ion exchange resin followed by elution with dilute hydrochloric acid and evaporation of the eluate gave the acid as a hygroscopic off-white solid contaminated with elutrient. Prolonged storage in a vacuum dessicator removed most of the hydrochloric acid.

Example 4

Following the procedure described in Example 2 but using ethanol isopropylene diamine in place of the ethylene diamine the ester and salts of N-(2-ethanol aminoisopropyl)-aspartic acid were formed.

Example 5

Following the procedure of Example 1 but using ethanol ethylene diamine in place of ethylene diamine the ester and salts of N-(2-ethanol aminoethyl)-aspartic acid were formed.

From Examples 4 and 5 it will be apparent that the amine used in the reaction with the maleic ester to form the desired maleic acid ester may be an alkanol amine. To develop the most favorable chelation function in the resulting compounds it should be a β-hydroxy alkanol amine, preferably of low molecular weight, such that in the generic formula:

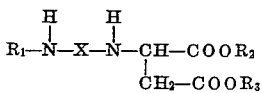

$R_1$ becomes a β-hydroxy alkanol group, such as hydroxy ethyl, hydroxy propyl or hydroxy isopropyl.

This application is a continuation-in-part of our application Serial No. 283,776, filed April 22, 1952, and now abandoned.

Though the invention has been described in conection with only a few specific examples, it is to be understood that variations thereof may be followed without departing from the spirit or scope of the invention.

What is claimed is:

1. Amino derivatives of N-alkyl substituted aspartic acids having the general formula:

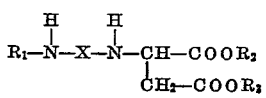

in which $R_2$ and $R_3$ may be alike and are members of the group consisting of hydrogen, alkali metal, ammonium bases and lower alkyl radicals; $R_1$ is a member of the group consisting of hydrogen, β-hydroxy lower alkyl, 2-aminoethyl, 2-aminoisopropyl, 3-aminopropyl, and X is alkylene and is a member of the group consisting of ethylene, isopropylene, n-propylene.

2. The compound N-(2-aminoethyl)-aspartic acid.
3. The compound N-(2-aminoisopropyl)-aspartic acid.
4. The compound N - [2 - (β - hydroxyethyl)-aminoethyl] aspartic acid.
5. The compound N - [2 - (β - hydroxyethyl)-aminoisopropyl aspartic acid.

References Cited in the file of this patent

UNITED STATES PATENTS

| 2,200,220 | Reppe et al. | May 7, 1940 |
| 2,438,091 | Lynch | Mar. 16, 1948 |

FOREIGN PATENTS

| 848,045 | Germany | Sept. 1, 1952 |